(12) United States Patent
Sohn et al.

(10) Patent No.: US 7,231,793 B2
(45) Date of Patent: Jun. 19, 2007

(54) WARM HYDRO-FORMING DEVICE

(75) Inventors: Sung Man Sohn, Yangsan (KR); Mun Yong Lee, Busan (KR); Bong Jun Kim, Busan (KR); Young Hoon Moon, Busan (KR)

(73) Assignee: Sungwoo Hitech Co., Ltd., Busan (KR)

( * ) Notice: Subject to any disclaimer, the term of this patent is extended or adjusted under 35 U.S.C. 154(b) by 328 days.

(21) Appl. No.: 11/040,521

(22) Filed: Jan. 21, 2005

(65) Prior Publication Data

US 2005/0186302 A1 Aug. 25, 2005

(30) Foreign Application Priority Data

Feb. 24, 2004 (KR) ...................... 10-2004-0012218

(51) Int. Cl.
B21D 26/02 (2006.01)
B21D 9/18 (2006.01)

(52) U.S. Cl. ..................... 72/61; 72/62; 72/342.96; 29/421.1

(58) Field of Classification Search ............... 72/61, 72/62, 57, 58, 342.96; 29/421.1
See application file for complete search history.

(56) References Cited

U.S. PATENT DOCUMENTS

| | | | | |
|---|---|---|---|---|
| 4,437,326 A | * | 3/1984 | Carlson | ................ 72/62 |
| 5,233,854 A | * | 8/1993 | Bowman et al. | ............ 29/421.1 |
| 5,475,911 A | * | 12/1995 | Wells et al. | .................... 72/61 |
| 5,960,658 A | * | 10/1999 | Hudson et al. | ............... 72/61 |
| 5,992,197 A | * | 11/1999 | Freeman et al. | ............... 72/62 |
| 6,322,645 B1 | * | 11/2001 | Dykstra et al. | .......... 72/342.96 |
| 6,349,538 B1 | * | 2/2002 | Hunter et al. | ................. 60/204 |
| 6,613,164 B2 | * | 9/2003 | Dykstra et al. | .......... 72/342.96 |
| 2004/0065394 A1 | * | 4/2004 | Ryu et al. | ..................... 72/54 |

FOREIGN PATENT DOCUMENTS

| DE | 10108419 | 9/2002 |
|---|---|---|
| DE | 10162439 | 7/2003 |

* cited by examiner

Primary Examiner—David B. Jones
(74) Attorney, Agent, or Firm—Alston & Bird LLP

(57) ABSTRACT

A warm hydro-forming device comprises: an upper mold and a lower mold respectively mounted to an upper mold die and a lower mold die; a lifting die installed to the lower mold die through a guide unit, an upper portion of the lifting die being connected to the upper mold die through a lifting unit to cooperatively operate in an upward and downward direction with the upper mold die; a pair of hydraulic pressure cylinders for providing an axial compression force to the tube component and supplying a forming hydraulic fluid into the tube component; an ascending and descending unit for ascending or descending the upper mold die; and a heating unit associated with the lifting die such that the heating unit can move toward or away from the tube component. The heating unit heats the tube component and a forming hydraulic fluid through a high frequency induction heating.

12 Claims, 9 Drawing Sheets

WARM HYDRO-FORMING DEVICE

CROSS REFERENCE TO RELATED APPLICATION

This application claims priority of Korean Application No. 10-2004-0012218, filed on Feb. 24, 2004, the disclosure of which is incorporated herein by reference.

TECHNICAL FIELD OF THE INVENTION

The present invention relates to a warm hydro-forming device, and more particularly, to a warm hydro-forming device in which a tube component and a forming hydraulic fluid is heated through a high frequency induction heating to a predetermined temperature at which the tube component can be easily formed.

BACKGROUND OF THE INVENTION

Generally, a hydro-forming method is performed at room temperature, e.g., in a temperature range of 10 to 30 degrees Celsius, and is one of the types of forming methods which perform expansion forming of a tube member using a hydraulic pressure. Through such a hydro-forming method, a weight of press-manufactured product that is formed as a combination of unit panels such as a front side member of a vehicle can be decreased and a manufacturing cost for the same can be reduced.

Recently, tube components that are formed through hydro-forming are generally made of high strength aluminum alloy instead of steel material to decrease weight. Such an aluminum alloy has poorer forming characteristics at room temperature than the steel material, but forming characteristics of such an aluminum alloy can be improved through a softening process. The softening process means a process to decrease a strength of the aluminum alloy as well as increase an elongation ratio of the aluminum alloy, and an annealing process is generally used as the softening process.

In order to obtain sufficient forming characteristics of the tube component that is made of a metal alloy such as an aluminum alloy, a sufficient elongation ratio must be obtained in consideration of a portion that has a maximum amount of deformation according to a shape of a formed component. The softening process is inevitable to obtain such an elongation ratio.

Referring to FIGS. 8 to 12, in a conventional hydro-forming method for an aluminum alloy, a softening process for an aluminum alloy tube component 100 to obtain a sufficient elongation ratio is performed at step S110.

Subsequently, as shown in FIG. 9, at step S120, the tube component 100 is loaded on a lower mold 101. Then, as shown in FIG. 10, at step S130, an upper mold 103 has been descended so that the upper and lower molds are joined together, and hydraulic pressure cylinders 105 and 107, which are disposed on both sides of the tube component 100, are operated to compress the tube component 100 in an axial direction thereby forming a sealing within the tube component 100.

Then, as shown in FIG. 11, at step S140, a forming hydraulic fluid is supplied into the tube component 100 from the hydraulic pressure cylinders 105 and 107. Consequently, the tube component 100 is expanded to forming surfaces 109 and 111 that are formed on the upper mold 103 and the lower mold 101.

After the tube component 100 is formed, the tube component is extracted from the lower and upper molds 101 and 103 at step S150. In addition, a hardening process for the tube component 100 is performed to increase a strength of the tube member that is weakened by the softening process. Such a hardening process may deteriorate a quality of the formed tube component and a productivity of the forming process.

Meanwhile, a warm hydro-forming method has been introduced, in which a tube component is heated in order to increase the forming characteristics of the tube component. A warm hydro-forming device for performing a warm hydro-forming method generally comprises heating means such as heating coils that are disposed within an upper mold and a lower mold.

However, conventional heating means were not effective for heating the tube member. In particular, if the tube component is heated by heat of the heating coils that are disposed within the upper and lower molds, the heating efficiency is not good. That is, only a portion of heat of the heating coil is transmitted to the tube component, and a majority portion of the heat is dissipated through the molds. In addition, because the heating coils are disposed within the upper and lower molds, it becomes difficult to manufacture such molds.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The motivation for the present invention is to provide a warm hydro-forming device that effectively heats a tube component with a high frequency induction heating.

An exemplary warm hydro-forming device according to an embodiment of the present invention comprises: first and second molds, such as an upper mold and a lower mold, being respectively provided with a forming surface for an expansion forming of a tube component and respectively mounted to first and second mold dies, such as an upper mold die and a lower mold die, to respectively compress first and second portions of the tube component, such as an upper portion and a lower portion of the tube component; a lifting die installed to the second mold die through a guide unit to be disposed around the second mold, a first portion of the lifting die, such as an upper portion of the lifting die, being connected to the first mold die through a lifting unit to cooperatively operate in a predetermined direction, such as an upward and downward direction, with the first mold die; a pair of hydraulic pressure cylinders for providing an axial compression force to the tube component by compressing both ends thereof in an axial direction, the hydraulic pressure cylinders supplying a forming hydraulic fluid into the tube component to generate a forming hydraulic pressure for forming the tube component; a positioning unit, such as an ascending and descending unit, fixed to an external fixture for positioning the first mold die, such as by ascending or descending the first mold die; and a heating unit associated with the lifting die such that the heating unit can move toward or away from the tube component, the heating unit heating the tube component and a forming hydraulic fluid within the tube component through a high frequency induction heating at a predetermined temperature.

A forming steel may be respectively disposed on the forming surface of the first and second molds.

The guide unit may comprise: a guide pin mounted, such as vertically, to the second mold die; and a guide hole formed in a portion, such as a lower portion, of the lifting die to receive the guide pin and thereby guiding the guide pin.

The lifting unit may comprise: pin holes formed in the first mold die and in the lifting die; and a lifting pin that is inserted into the pin holes and provided with a stopper at both ends thereof, to move the lifting die in response to movement of the first mold die.

The pair of hydraulic pressure cylinders may be mounted to the lifting die on both sides of a longitudinal direction of the tube component.

The positioning unit may comprise a hydraulic cylinder that is actuated by a hydraulic pressure, and a rod of the hydraulic cylinder is connected to the first mold die, such as at a first end of the rod.

The heating unit may comprise: an outer housing slidably disposed on a rail of a guide frame that is disposed on an opposite side of the lifting die, a front surface of the outer housing being opened and the outer housing defining a space portion therein; a guide housing slidably disposed within the space portion of the outer housing, a front surface of the guide housing being opened and the guide housing defining a space portion therein, two guide rails being respectively provided on both inner side surfaces of the guide housing, the two guide rails gradually widening toward an opened surface of the guide housing, and a plurality of slots being formed in a rear surface of the guide housing; first and second heating heads, such as upper and lower heating heads, both sides of which are slidably connected to the guide rails of the guide housing, and first and second heating heads being connected to an external high frequency induction heater; a forward and rearward movement plate disposed in a rear portion of the guide housing within the space portion of the outer housing, the forward and rearward movement plate being connected to the first and second heating heads through a plurality of guide beams that are inserted into the slots formed in the rear surface of the guide housing; first and second coil holders, such as upper and lower coil holders, connected respectively to the first and second heating heads through operating coils, and high frequency coils being respectively wound in inner portions thereof; a holding cylinder fixed to the forward and rearward movement plate and urging the guide housing to move in a forward or rearward direction with respect to the forward and rearward movement plate; a first forward and rearward movement cylinder fixed to the guide frame and urging the outer housing to move with respect to the guide frame; and a pair of second forward and rearward movement cylinders fixed to the outer housing and urging the forward and rearward movement plate to move in a front or rear direction with respect to the outer housing.

The outer housing may be formed as a rectangular shape, and a supporting stopper is provided at a corner of a rear surface of the outer housing.

The holding cylinder may be a pneumatic cylinder. In addition, each of the first forward and rearward movement cylinders and the second forward and rearward movement cylinders may be a pneumatic cylinder.

The guide beams may be connected through the guide slot to the forward and rearward movement plate such that the guide beams can move in a predefined direction, such as upwardly and downwardly.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, an embodiment of the present invention will be described in detail with reference to the accompanying drawings.

A warm hydro-forming device according to an embodiment of the present invention can heat a tube component at a predetermined temperature (for example, a temperature within a temperature range of 50 to 300 degrees Celsius), and then forms the tube component by supplying a forming hydraulic fluid into the tube component.

Figure 1:
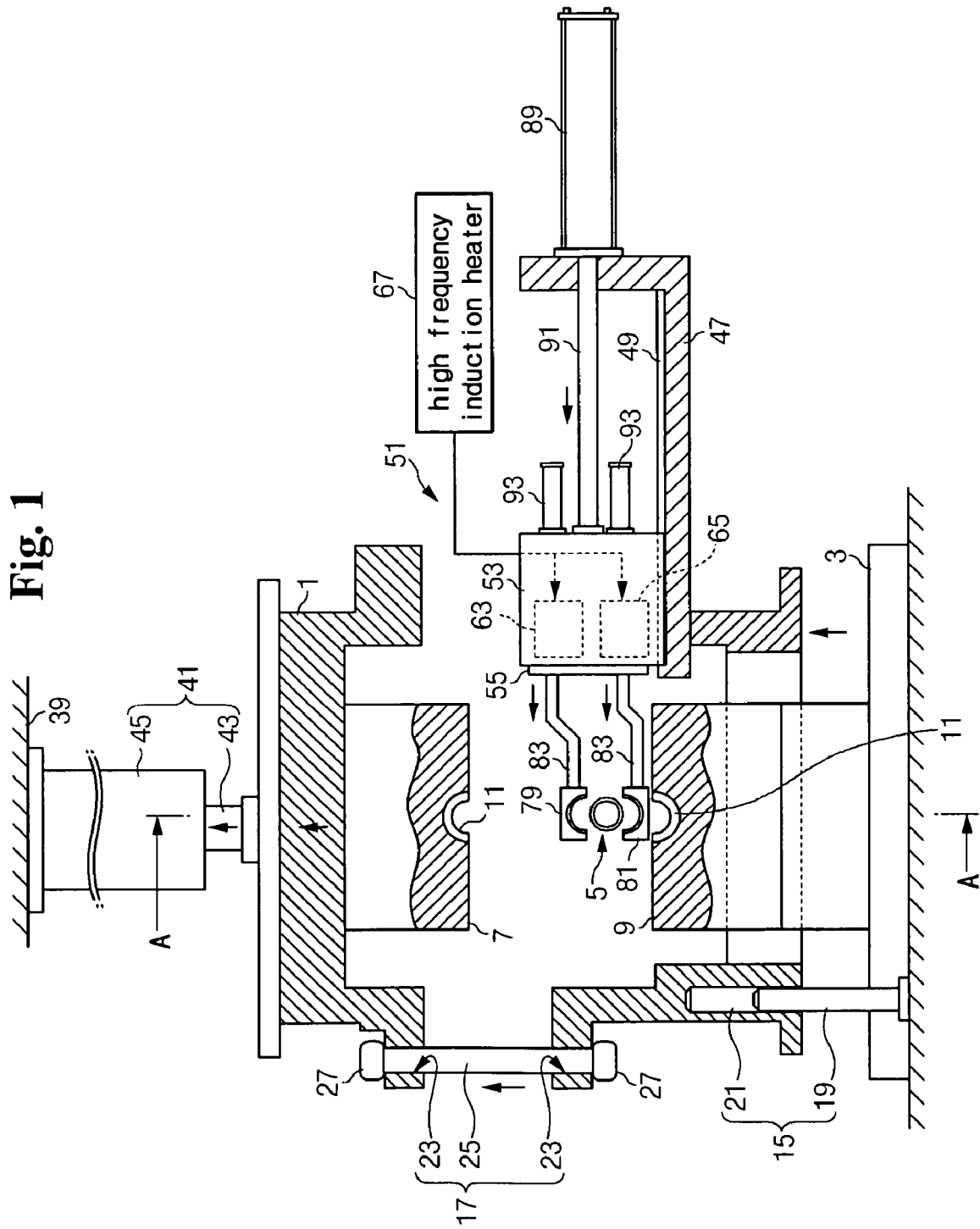
FIG. 1 is a schematic sectional view of a warm hydro-forming device according to an embodiment of the present invention.
Figure 2:
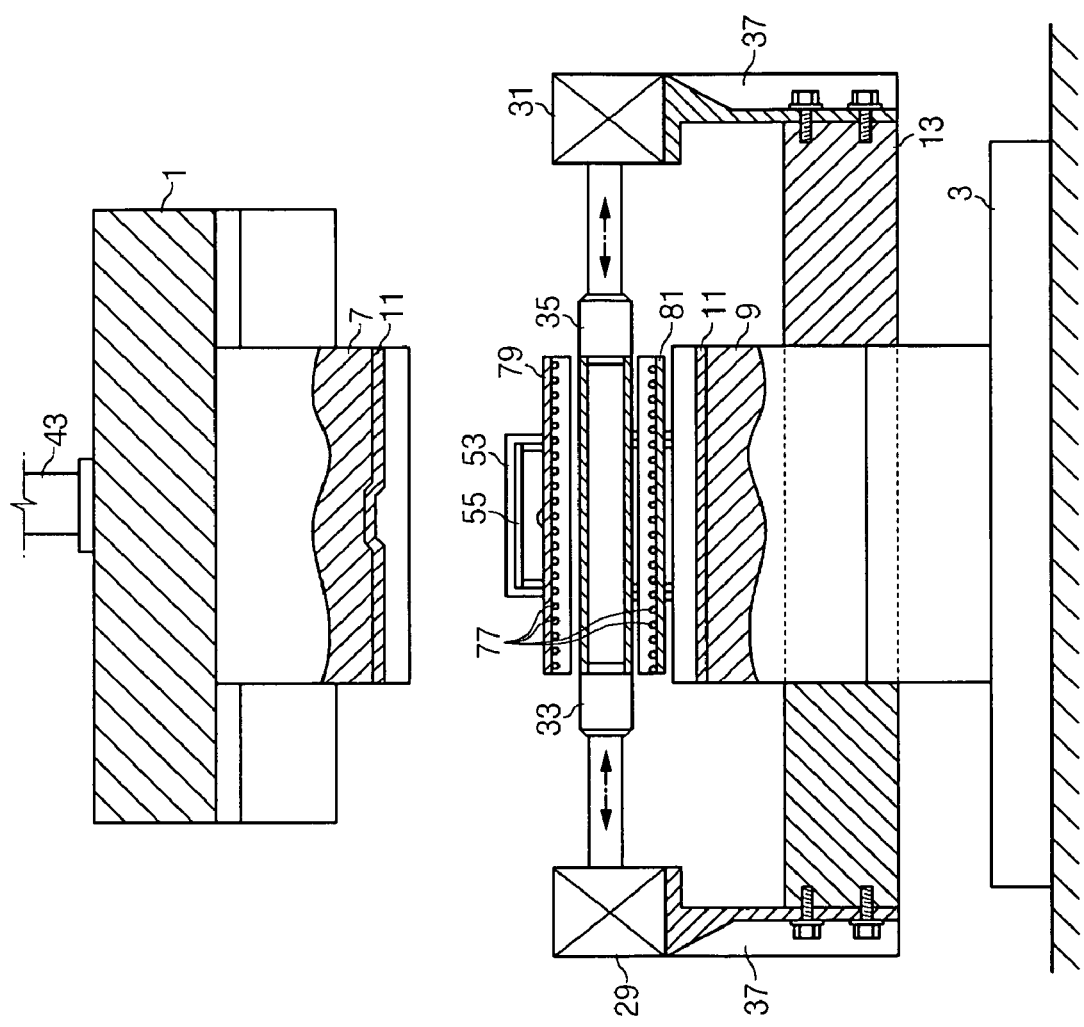
FIG. 2 is a sectional view along a line A—A in FIG. 1.

FIG. 1 is a schematic sectional view of a warm hydro-forming device according to an embodiment of the present invention, and FIG. 2 is a sectional view along a line A—A in FIG. 1.

With reference to FIG. 1, an upper mold die 1 is provided and a lower mold die 3 is provided below the upper mold die 1.

An upper mold 7 and a lower mold 9 are respectively mounted to the upper mold die 1 and the lower mold die 3 to respectively compress an upper portion and a lower portion of the tube component 5, and the upper and lower molds 7 and 9 are respectively provided with a forming surface for a tube component 5 that will be formed.

Forming steels 11 are respectively disposed on the forming surface of the upper and lower molds 7 and 9.

A lifting die 13 is disposed around the lower mold 9. The lifting die 13 is installed to the lower mold die 3 through a guide unit, and an upper portion of the lifting die 13 is connected to the upper mold die 1 through a lifting unit 17 to cooperatively operate in an upward and downward direction with the upper mold die 1.

The guide unit 15 may comprise a guide pin 19 and a guide hole 21. The guide pin 19 is vertically mounted to the lower mold die 3, and the guide hole 21 is formed in a lower portion of the lifting die 13 to receive the guide pin 19 and thereby guiding the guide pin 19.

The lifting unit 17 may comprise pin holes 23 and a lifting pin 25. The pin holes 23 are formed respectively in the upper mold die 1 and the lifting die 17, and the lifting pin 25 is inserted into the pin holes 23 and provided with stoppers 27 at both ends thereof so that the lifting pin 25 ascends the lifting die 13 after a specific time in response to an upward movement of the upper mold die 1.

As shown in FIG. 2, a pair of hydraulic pressure cylinders 29 and 31 are installed on both sides of the lifting die 13. The hydraulic pressure cylinders 29 and 31 provide an axial compression force by compressing both ends of the tube component 5 in an axial direction through punches 33 and 35, and supply a forming hydraulic fluid into the tube component 5 to generate a forming hydraulic pressure for forming the tube component 5.

The pair of hydraulic pressure cylinders 29 and 31 are mounted to the lifting die 13 through mounting brackets 37 at a specific level, on both sides of a longitudinal direction of the tube component 5, so that the hydraulic pressure cylinders 29 and 31 ascend and descend with the lifting die 13.

As shown in FIG. 1, an ascending and descending unit 41 is fixed to an external fixture 39, and ascends or descends the upper mold die 1. The ascending and descending unit 41 may include a hydraulic cylinder that is actuated by a hydraulic pressure and a front end of an operating rod which is connected to the upper mold die 1 to ascend or descend the upper mold die 1.

A guide frame 47 is provided on one side of the lifting die 13 along a direction perpendicular to the longitudinal direction of the tube component 5, and a rail 49 is formed on the guide frame 47 along a longitudinal direction of the guide frame 47.

A heating unit 51 is associated with the lifting die 13 such that the heating unit 51 can move toward or away from the tube component 5 that is fixed by punches 33 and 35 of the hydraulic pressure cylinders 29 and 31. That is, the heating unit 51 is slidably connected to the rail 49 to move toward of away from the tube component 5. The heating unit 51 may be configured to surround the tube component 5 and transmit heat to the tube component 5 through a high frequency induction heating, thereby heating the tube component and the forming hydraulic fluid within the tube component 5.

Figure 3:
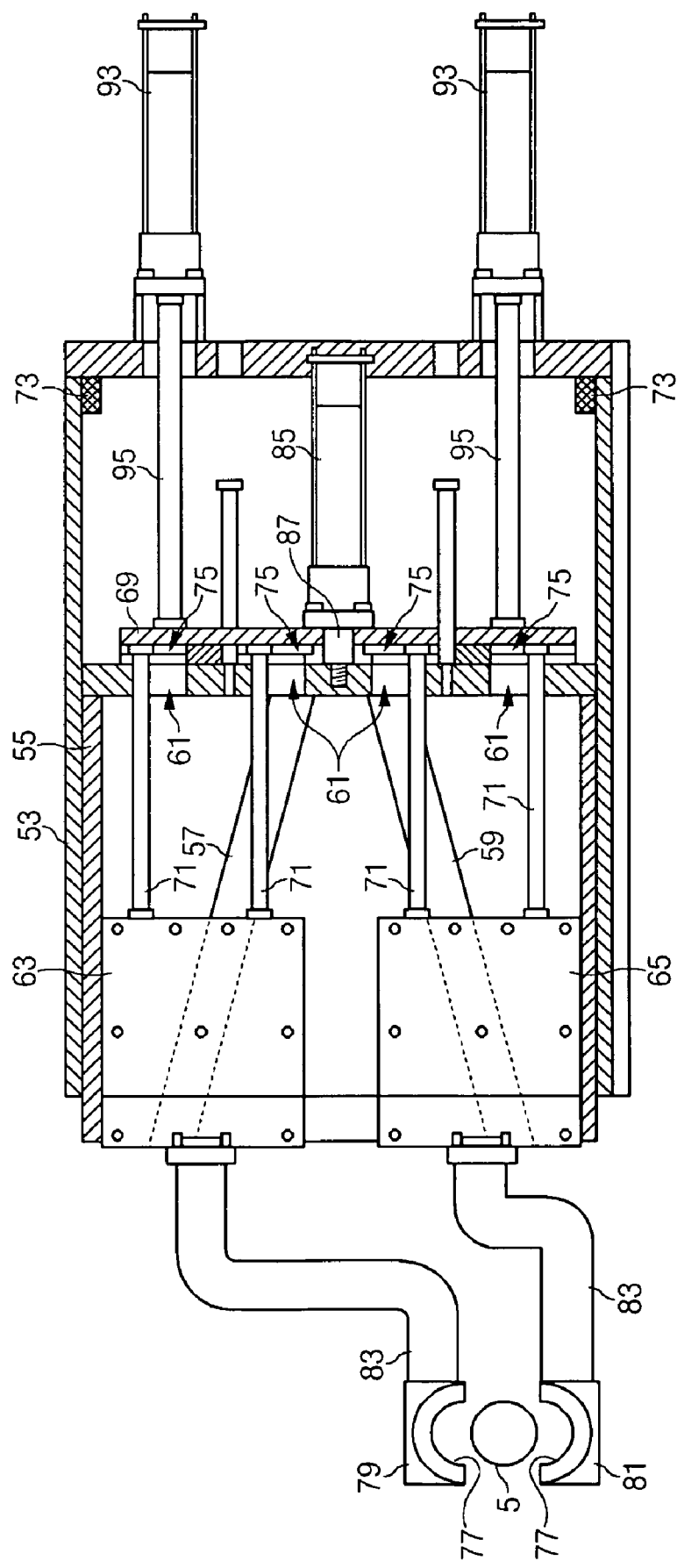
FIG. 3 shows a state of a heating unit in an operating state of FIG. 1.

As shown in FIG. 3, an outer housing 53 is slidably disposed on the rail 49 of the guide frame 49 that is disposed on an opposite side of the lifting die 13, and a front surface of the outer housing 53 is opened. The outer housing 53 defines a space portion therein, and is formed as a rectangular shape.

A guide housing 55 is slidably disposed within the space portion of the outer housing 53. A front surface of the guide housing 55 is opened, and the guide housing 55 defines a space portion therein.

Two guide rails 57 and 59 are respectively provided on both inner side surfaces of the guide housing 55. The two guide rails 57 and 59 gradually widen toward an opened surface of the guide housing 55, and a plurality of slots 61 are formed in a rear surface of the guide housing 55.

Upper and lower heating heads 63 and 65 are disposed within an inner space portion of the guide housing 55. Both sides of the upper and lower heating heads 63 and 65 are slidably connected to the guide rails 57 and 59 of the guide housing 55, so that the upper and lower heating heads 63 and 65 can move on the guide rails 57 and 59 while approaching to each other or departing from each other. The upper and lower heating heads 63 and 65 are connected to an external high frequency induction heater 67, as shown in FIG. 1.

A forward and rearward movement plate 69 is disposed in a rear portion of the guide housing 55 within the inner space portion of the outer housing 53. The forward and rearward movement plate 69 is connected to the upper and lower heating heads 63 and 65 through a plurality of guide beams 71 that are inserted into the slots 61 formed in the rear surface of the guide housing 55. The guide beams 71 move up and down within the slots 61 while the upper and lower heating heads 63 and 65 move. That is, the guide beams 71 are connected through the guide slots 61 to the forward and rearward movement plate 69 such that the guide beams 71 can move upwardly or downwardly.

Supporting stoppers 73 are provided at corners of a rear surface of the outer housing to support the rear surface of the guide housing 55.

Upper and lower coil holders 79 and 81 are connected respectively to the upper and lower heating heads 63 and 65 through operating coils 83, and high frequency coils 77, which are connected to the operating coils 83, are respectively wound in inner portions of the upper and lower coil holders 79 and 81 as shown in FIGS. 2 and 3.

A holding cylinder 85 is fixed to a center portion of the forward and rearward movement plate 69. The holding cylinder 85 urges the guide housing 55 to move in a forward or rearward direction with respect to the forward and rearward movement plate 69. The holding cylinder 85 may include an operating rod 87 that is fixedly connected to the rear surface of the guide housing 55.

A first forward and rearward movement cylinder 89 is fixed to an outer portion of the guide frame 47, the first forward and rearward movement cylinder 89 urges the outer housing 53 to move with respect to the guide frame. The first forward and rearward movement cylinder 89 may include an operating rod 91 that is fixedly connected to the rear surface of the outer housing 53.

A pair of second forward and rearward movement cylinders 93 are fixed to the outer housing 53. The second forward and rearward movement cylinders 93 urge the forward and rearward movement plate 69 to move in a front or rear direction with respect to the outer housing 53. The second forward and rearward movement cylinders 93 may include an operating rod 95 that is fixedly connected to the rear surface of the forward and rearward movement plate 69.

The holding cylinder 85 may be a pneumatic cylinder having a pneumatic pressure as an operating pressure, and the first and second forward and rearward movement cylinders 91 and 93 may also be a pneumatic cylinder.

According to the warm hydro-forming device of the embodiment of the present invention, the tube component (e.g., made of aluminum alloy) 5 disposed between the molds 7 and 9 is expanded along the forming surface formed in the molds 7 and 9 by the axial compression of the hydraulic pressure cylinders 29 and 31 and a hydraulic pressure of the forming hydraulic pressure fluid supplied into the tube component 5. At this time, the tube component 5 is heated to a specific temperature by the heating unit 51 after the forming hydraulic fluid is supplied into the tube component 5, so that the tube component 5 and the forming hydraulic fluid within the tube component 5 are heated to a specific temperature. Then, the forming hydraulic fluid is finally supplied into the tube component 5 to expand the tube component 5.

If the tube component 5 is made of aluminum alloy, the tube component 5 is preferably heated within a temperature range of 50 to 300 degrees Celsius in which the tensile strength decreases a little bit but the elongation ratio of aluminum alloy increases rapidly.

Figure 7:
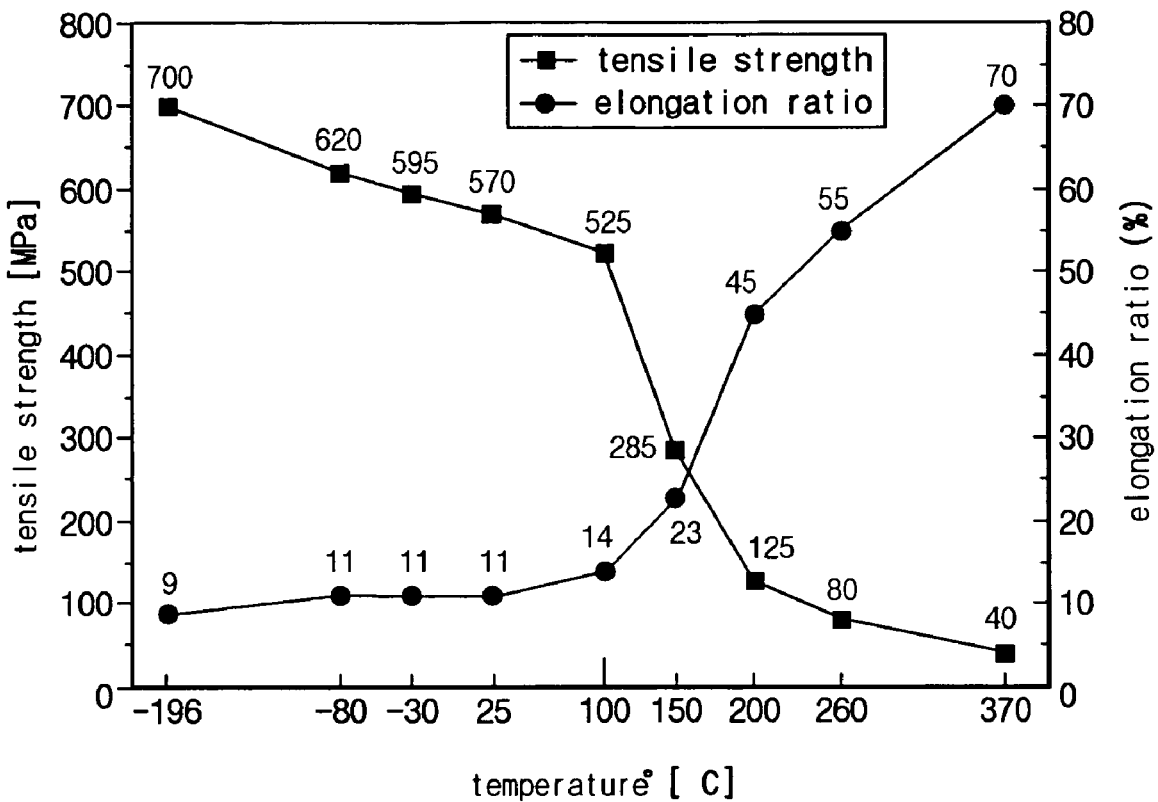
FIG. 7 illustrates a correlation between the tensile strength and the elongation ratio of an aluminum alloy (AL 7075) tube component.
Figure 8:
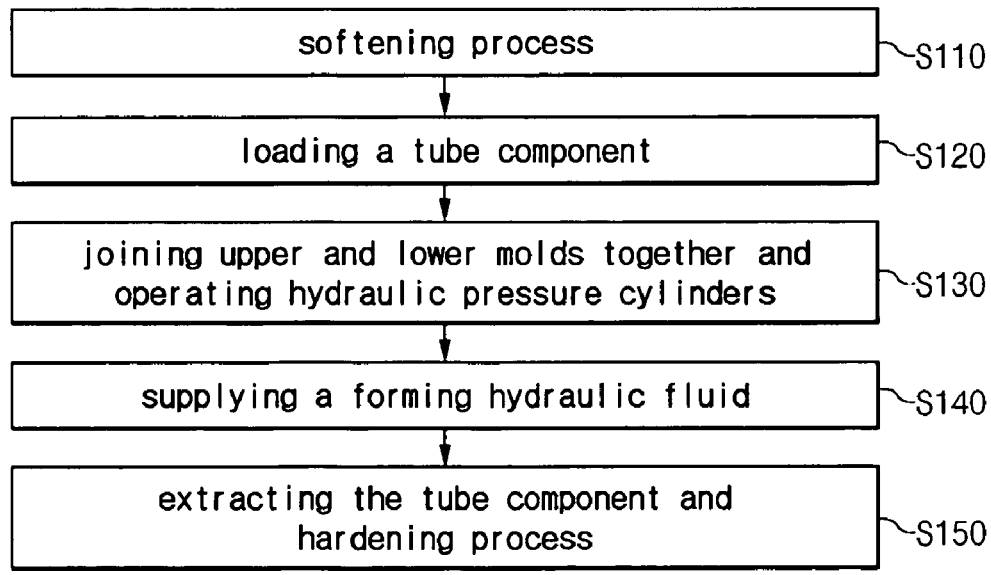
FIG. 8 is a flowchart showing a conventional warm hydro-forming method.
Figure 9:
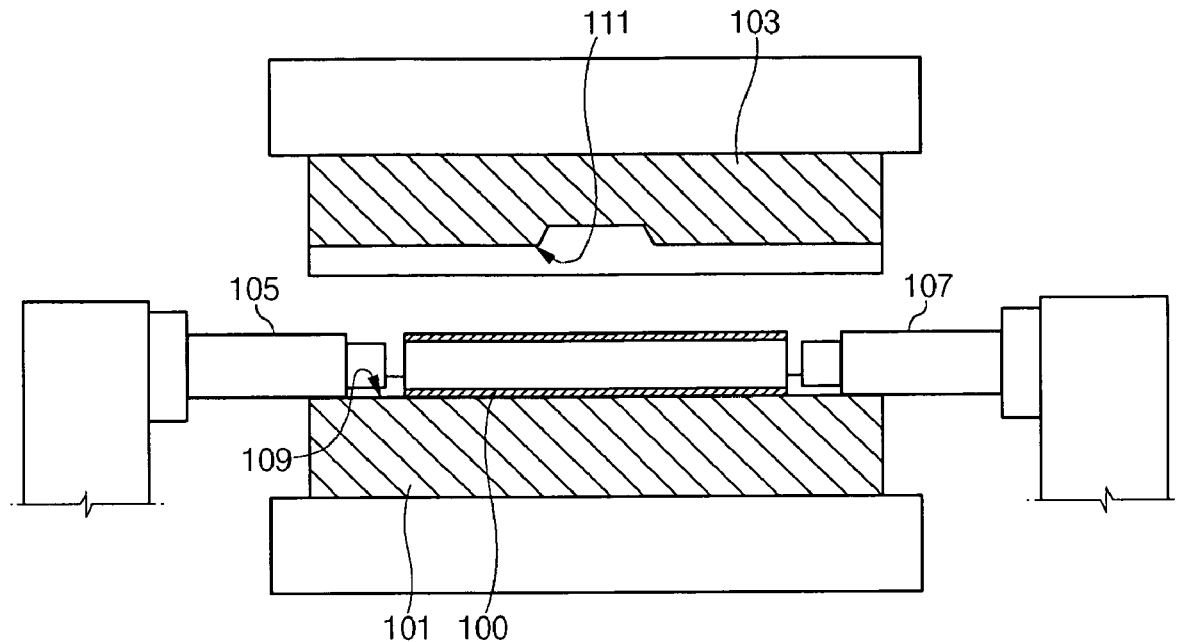
FIGS. 9 to 12 show operating states of a conventional warm hydro-forming device.
Figure 10:
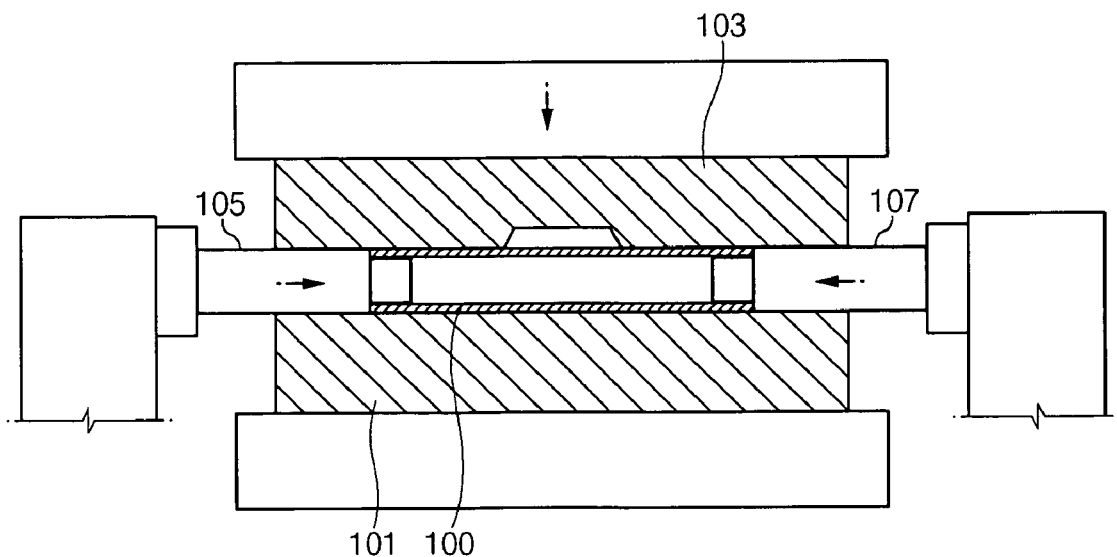
Figure 11:
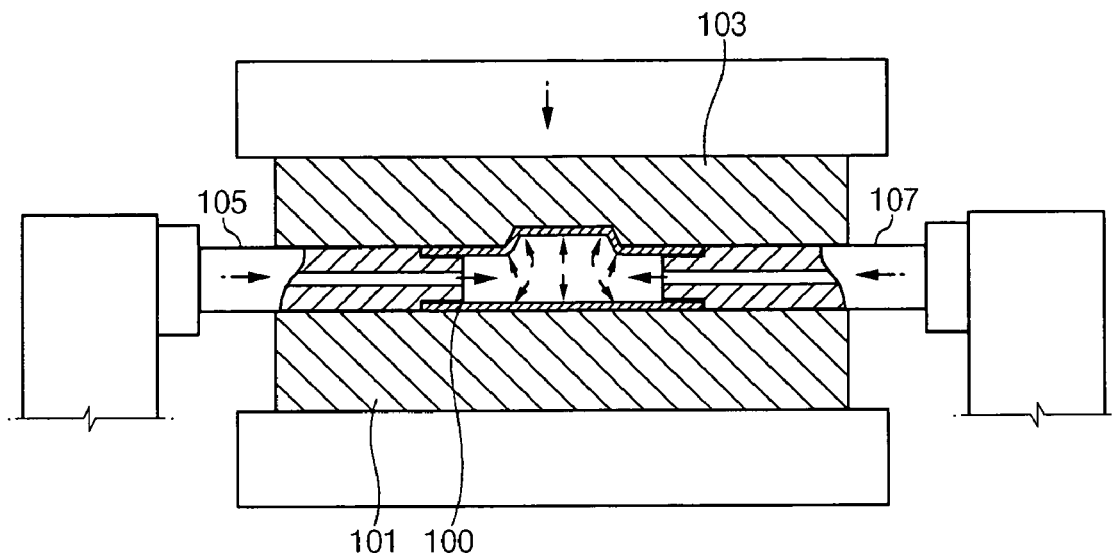
Figure 12:
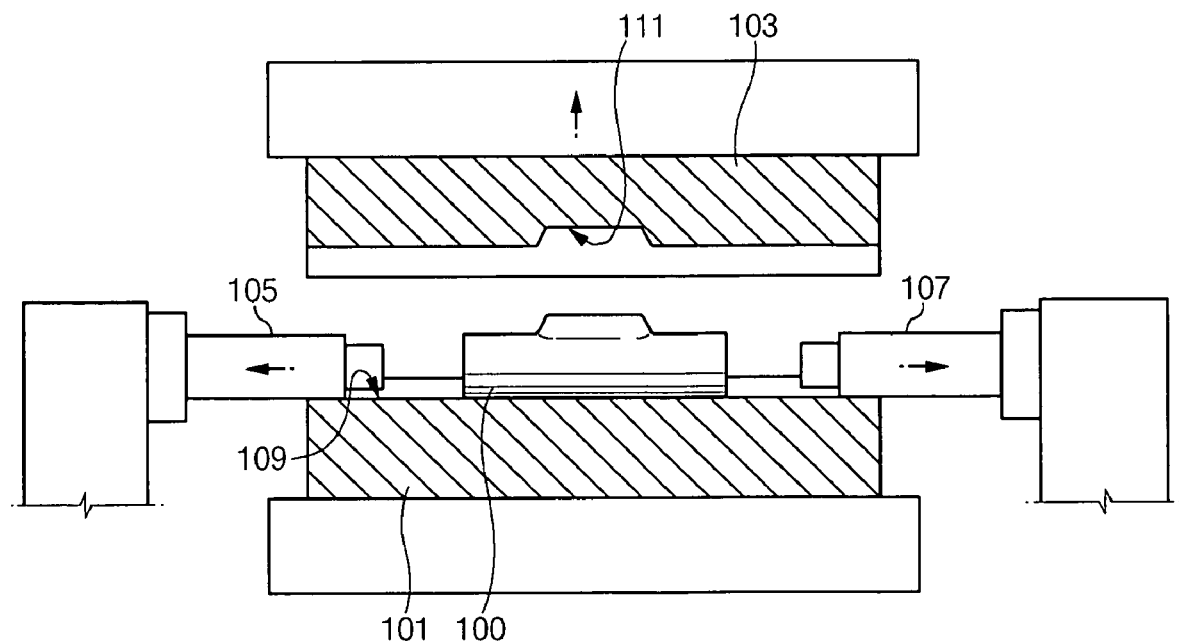

FIG. 7 illustrates a correlation between the tensile strength and the elongation ratio of an aluminum alloy tube component (e.g., AL 7075 tube component). As shown in FIG. 7, the tensile strength is in a range of 570 MPa to 525 MPa and the elongation ratio is in a range of 11% to 14% in a temperature range of 25 degrees Celsius to 100 degrees Celsius, however, in a high temperature range of 150 degrees Celsius to 370 degrees Celsius the tensile strength rapidly decreases from 285 MPa to 40 MPa but the elongation ratio rapidly increases from 23% to 70%.

Because the hydro-forming is performed at the high temperature, a silicon oil, that may operate stably at a high temperature range of 150 degrees Celsius to 370 degrees Celsius, is suitable for the forming hydraulic fluid.

The warm hydro-forming device according to an embodiment of the present invention operates as follows. At first, as shown in FIGS. 1 and 2, the tube component 5 is fixed and sealed by the punches 33 and 35 of the hydraulic pressure cylinders 29 and 31 in a state in which the upper mold and lower molds are separated from each other, and the forming hydraulic fluid is supplied into the tube component 5.

Then, by forwardly operating the first forward and rearward movement cylinder 89 of the heating unit 51, the outer housing 53 is moved toward the tube component 5 on the rail 49 of the guide frame 47.

Then, as shown in FIG. 3, by forwardly operating the second forward and rearward movement cylinder 93, the guide housing 55 is forwardly moved with respect to the outer housing 53, so that the upper and lower coil holders 79 and 81 are disposed at the upper and lower portions of the tube component 5 that is supported by the hydraulic pressure cylinders 29 and 31.

Figure 4:
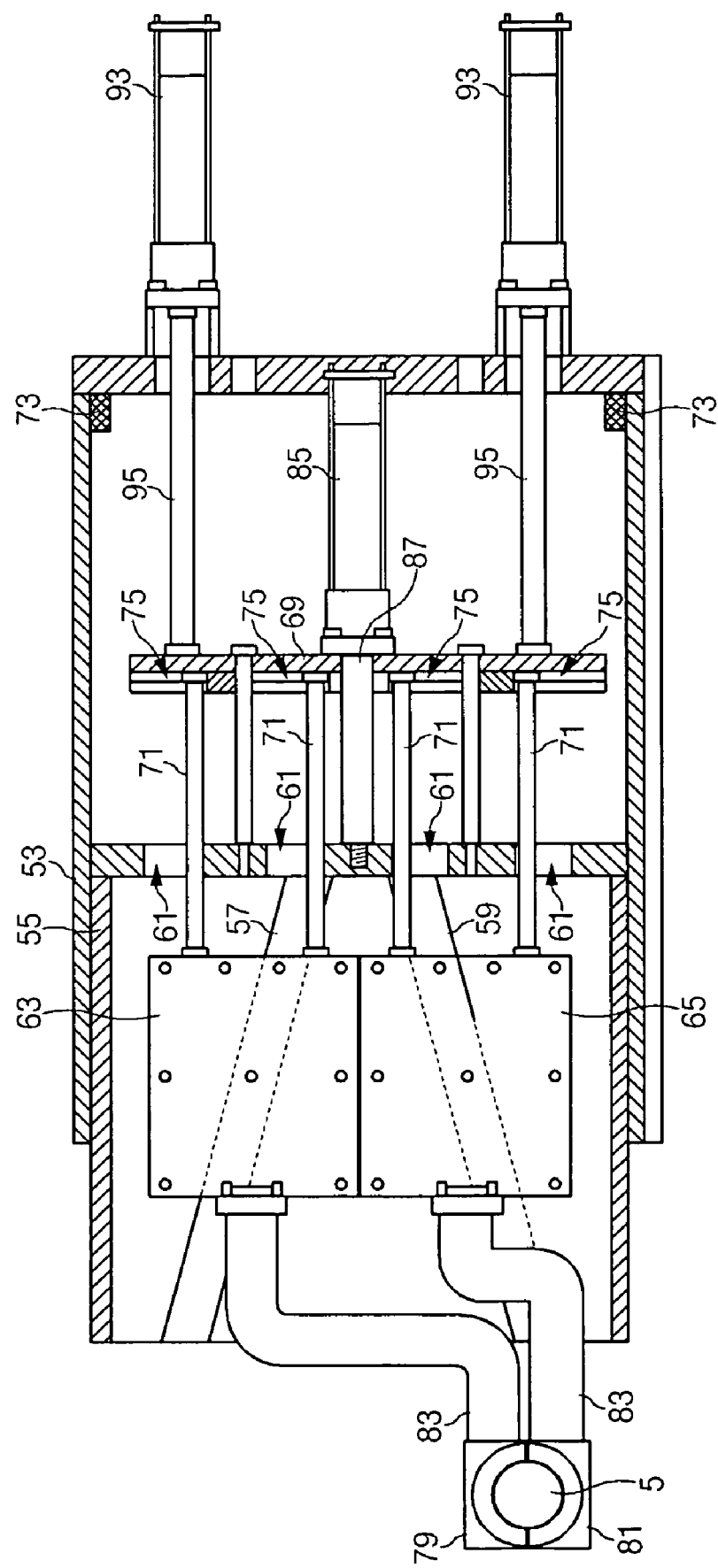
FIG. 4 shows a state of a heating unit while it heats the tube component.

As shown in FIG. 4, if the holding cylinder 85 forwardly operates in this state, i.e., if the holding cylinder 85 moves the guide housing 55 in a forward direction with respect to the forward and rearward movement plate 69, the upper and lower heating heads 63 and 65, that are maintained at a constant distance from the forward and rearward movement plate 69 by the guide beams 71, approach together while moving on the guide rails 57 and 59 formed on the side surfaces of the guide housing 55.

Then, a distance between the heating heads 63 and 65 is decreased, so that the upper and lower coil holders 79 and 81 surround upper and lower portions of the tube component 5 that is supported by the hydraulic pressure cylinders 29 and 31. Under this situation, a high frequency signal is outputted from the high frequency induction heater 67, and thereby the tube component 5 and the forming hydraulic fluid within the tube component 5 are heated to the specific temperature by the high frequency induction heating.

Figure 5:
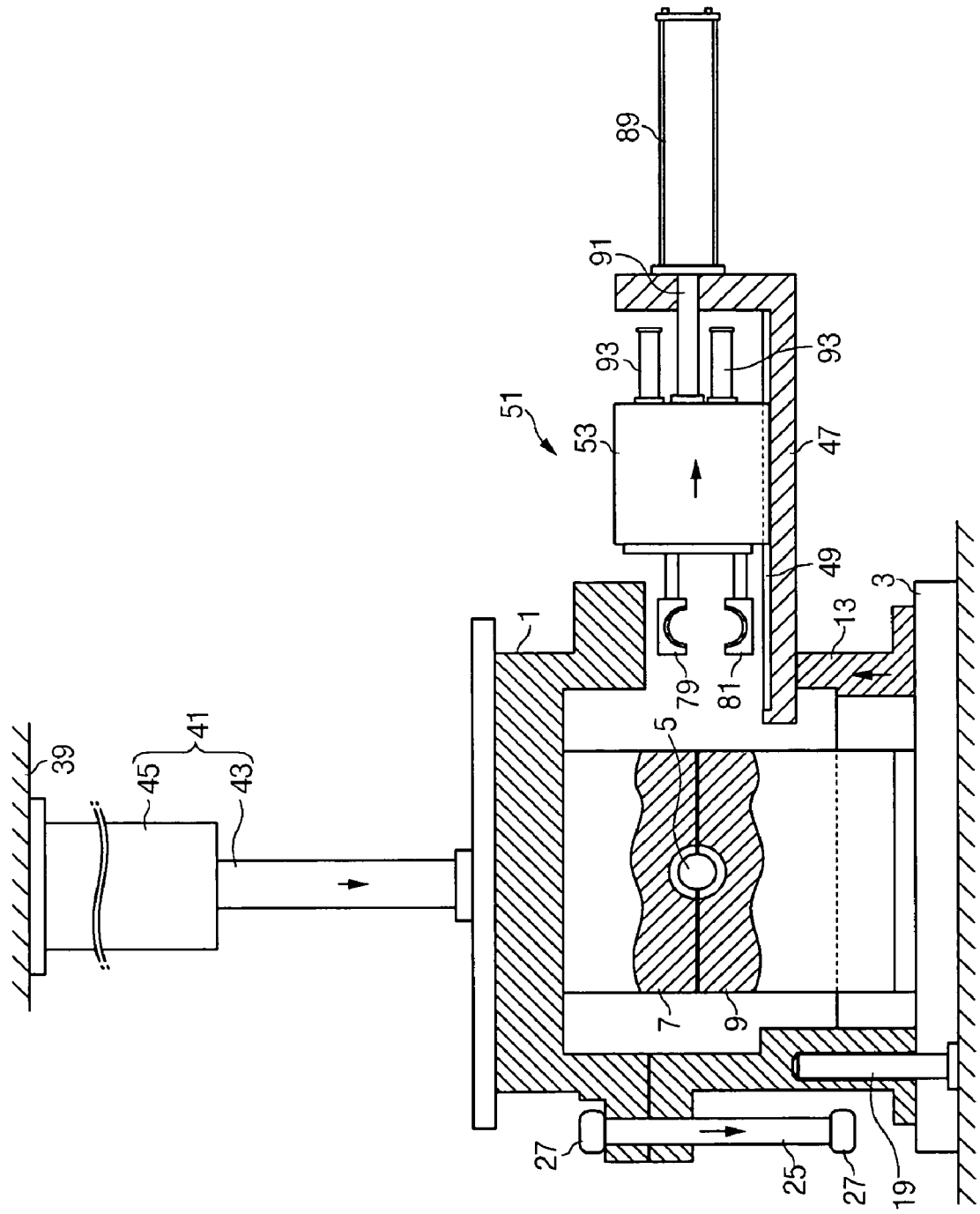
FIG. 5 shows a state of the warm hydro-forming device according to an embodiment of the present invention in a forming operation.
Figure 6:
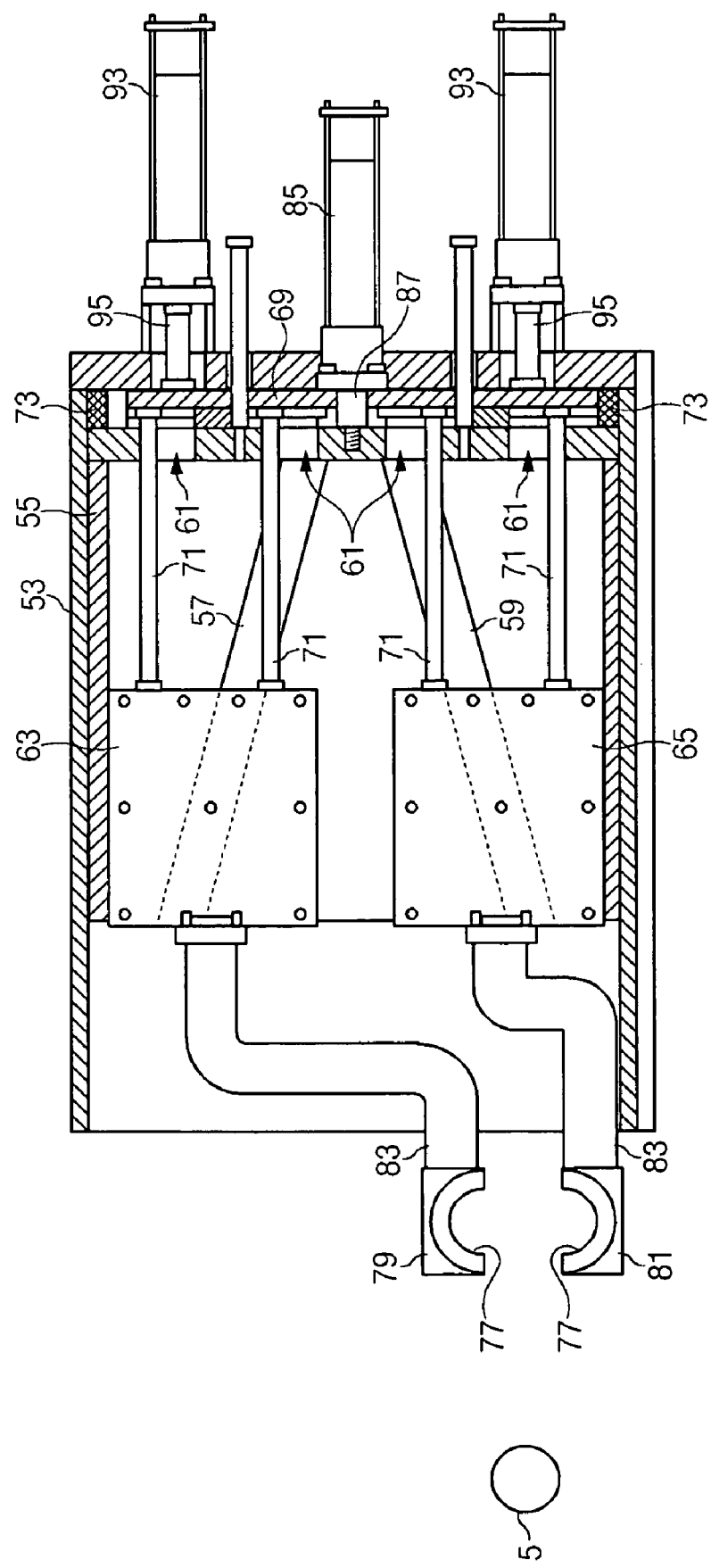
FIG. 6 shows a state of a heating unit in FIG. 5.

After the heating, the heating unit 51 is retreated in a reverse sequence. Rearward operations of the holding cylinder 85, the second forward and rearward movement cylinder 93, and the first forward and rearward movement cylinder 89 are sequentially performed, so that the upper and lower coil holders 79 and 81 are deviated from the upper and lower molds 7 and 9 as shown in FIG. 5. Finally, the heating unit 51 is in state shown in FIG. 6.

After the forming hydraulic fluid and the tube component 5 are heated to the specific temperature and the heating unit 51 is retreated, the hydraulic cylinder 45 of the ascending and descending unit 41 descends the upper mold die 1. As shown in FIG. 5, if the upper mold die 1 is being descended, the lifting die 13 is also being descended and simultaneously the hydraulic pressure cylinders 29 and 31 and the upper mold 7 are also descended. Accordingly, the tube component 5 is pressurized between the upper and lower molds 7 and 9.

By supplying the forming pressure into the tube component 5 under this condition, the tube component 5 is extended along the forming surface.

Finally, the formed tube component 5 is extracted from the upper and lower molds 7 and 9, and is then cooled.

According to an embodiment of the present invention, because the tube component is heated by a high frequency induction heating, the tube component is effectively and easily heated. Furthermore, because the heating unit automatically moves toward and away from the tube component that is supported by the hydraulic pressure cylinders between the upper and lower molds, a process for heating the tube component becomes very simple.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. For example, while the above-described embodiments have implied a particular orientation with the discussion of upper and lower molds, for example, the warm hydro-forming device may be oriented in other manners if so desired.

What is claimed is:

1. A warm hydro-forming device comprising:
   a first mold and a second mold being respectively provided with a forming surface for an expansion forming of a tube component and respectively mounted to a first mold die and a second mold die to respectively compress a first portion and a second portion of the tube component;
   a lifting die installed to the second mold die through a guide unit to be disposed around the second mold, a first portion of the lifting die being connected to the first mold die through a lifting unit to cooperatively operate in a predetermined direction with the first mold die;
   a pair of hydraulic pressure cylinders for providing an axial compression force to the tube component by compressing both ends thereof in an axial direction, the hydraulic pressure cylinders supplying a forming hydraulic fluid into the tube component to generate a forming hydraulic pressure for forming the tube component;
   a positioning unit fixed to an external fixture for positioning the first mold die; and
   a heating unit associated with the lifting die such that the heating unit is capable of moving toward or away from the tube component, and the heating unit heating the tube component and a forming hydraulic fluid within the tube component through a high frequency induction heating at a predetermined temperature.

2. The warm hydro-forming device of claim 1, wherein a forming steel is respectively disposed on the forming surface of the first and second molds.

3. The warm hydro-forming device of claim 1, wherein the guide unit comprises:
   a guide pin mounted to the second mold die; and
   a guide hole formed in a second portion of the lifting die to receive the guide pin and thereby guiding the guide pin.

4. The warm hydro-forming device of claim 1, wherein the lifting unit comprises:
   pin holes formed in the first mold die and in the lifting die; and
   a lifting pin that is inserted into the pin holes and provided with a stopper at both ends thereof, to ascend the lifting die in response to an upward movement of the first mold die.

5. The warm hydro-forming device of claim 1, wherein the pair of hydraulic pressure cylinders are mounted to the lifting die on both sides of a longitudinal direction of the tube component.

6. The warm hydro-forming device of claim 1, wherein the positioning unit comprises a hydraulic cylinder that is actuated by a hydraulic pressure, and a rod of the hydraulic cylinder is connected to the first mold die.

7. The warm hydro-forming device of claim 1, wherein the heating unit comprises:
- an outer housing slidably disposed on a rail of a guide frame that is disposed on an opposite side of the lifting die, a front surface of the outer housing being opened and the outer housing defining a space portion therein;
- a guide housing slidably disposed within the space portion of the outer housing, a front surface of the guide housing being opened and the guide housing defining a space portion therein, two guide rails being respectively provided on both inner side surfaces of the guide housing, the two guide rails gradually widening toward an opened surface of the guide housing, and a plurality of slots being formed in a rear surface of the guide housing;
- first and second heating heads both sides of which are slidably connected to the guide rails of the guide housing, and first and second heating heads being connected to an external high frequency induction heater;
- a forward and rearward movement plate disposed in a rear portion of the guide housing within the space portion of the outer housing, the forward and rearward movement plate being connected to the first and second heating heads through a plurality of guide beams that are inserted into the slots formed in the rear surface of the guide housing;
- first and second coil holders connected respectively to the first and second heating heads through operating coils, and high frequency coils being respectively wound in inner portions thereof;
- a holding cylinder fixed to the forward and rearward movement plate and urging the guide housing to move in a forward or rearward direction with respect to the forward and rearward movement plate;
- a first forward and rearward movement cylinder fixed to the guide frame and urging the outer housing to move with respect to the guide frame; and
- a pair of second forward and rearward movement cylinders fixed to the outer housing and urging the forward and rearward movement plate to move in a front or rear direction with respect to the outer housing.

8. The warm hydro-forming device of claim 7, wherein the outer housing is formed as a rectangular shape.

9. The warm hydro-forming device of claim 7, wherein a supporting stopper is provided at a corner of a rear surface of the outer housing.

10. The warm hydro-forming device of claim 7, wherein the holding cylinder is a pneumatic cylinder.

11. The warm hydro-forming device of claim 7, wherein each of the first forward and rearward movement cylinder and the second forward and rearward movement cylinders is a pneumatic cylinder.

12. The warm hydro-forming device of claim 7, wherein the guide beams are connected through the guide slot to the forward and rearward movement plate such that the guide beams can move in a predefined direction.

* * * * *